United States Patent [19]
Allen

[11] Patent Number: 5,795,008
[45] Date of Patent: Aug. 18, 1998

[54] PROTECTIVE COVER FOR MOTORCYCLES AND THE LIKE

[76] Inventor: John M. Allen, 5661 E. Presidio Rd., Scottsdale, Ariz. 85254

[21] Appl. No.: 647,750

[22] Filed: May 15, 1996

[51] Int. Cl.[6] ................................................. B60J 11/00
[52] U.S. Cl. .................... 296/98; 296/136; 160/302; 242/375.3; 242/385.4
[58] Field of Search ............... 296/98, 136; 160/23.1, 160/301, 302, 313, 315, 370.22; 242/375.3, 385.4

[56] References Cited

U.S. PATENT DOCUMENTS

| | | | |
|---|---|---|---|
| 169,450 | 11/1875 | Lake | 160/313 X |
| 730,868 | 6/1903 | Brown | 242/375.3 |
| 1,125,377 | 1/1915 | Nichols | 242/376 |
| 1,193,032 | 8/1916 | Linster | 242/376 |
| 1,853,742 | 4/1932 | Owen et al. | 135/88.01 |
| 1,912,231 | 5/1933 | Wandscheer . | |
| 1,944,264 | 1/1934 | Oravec et al. | 242/375.3 |
| 2,133,551 | 10/1938 | Logan | 242/375.3 X |
| 2,181,141 | 11/1939 | Lovegran | 242/102 |
| 2,646,097 | 7/1953 | Gaverth et al. | 150/52 |
| 2,773,547 | 12/1956 | Voss | 160/301 |
| 4,171,145 | 10/1979 | Pearson | 296/78.1 |
| 4,720,135 | 1/1988 | Farina | 296/136 |
| 4,764,998 | 8/1988 | Norris et al. | 4/502 |
| 5,052,738 | 10/1991 | Li | 296/78.1 |
| 5,088,788 | 2/1992 | Moulton | 296/136 |
| 5,125,713 | 6/1992 | Willingham et al. | 296/98 |
| 5,400,521 | 3/1995 | Waldherr | 242/385.4 X |

FOREIGN PATENT DOCUMENTS

| | | |
|---|---|---|
| 366539 | 2/1932 | United Kingdom . |
| 473572 | 10/1937 | United Kingdom . |

*Primary Examiner*—Dennis H. Pedder
*Attorney, Agent, or Firm*—William J. Hallihan; Louis J. Hoffman

[57] ABSTRACT

A compact retractable protective covering apparatus, preferably enclosed in a housing, is designed for attachment to a motorcycle or other vehicle. A spring-actuated spool is mounted in the housing surrounding the spring, which in turn surrounds a support rod. One end of the spring is fixed in place, while the other end is structured to rotate in a fixed proportion to the rotation of the spool by a system of gears. The proportion should be less than one to one, so that the spring rotates less than the number of rotations of the spool. A protective cover is wound around the spool and can be withdrawn from the housing and extended over the entire motorcycle. An automatic locking mechanism is provided that prevents the cover from retracting when it is extended. The locking mechanism includes a pawl that engages and prevents one of the gears from rotating in at least one direction. A lever is provided for the locking mechanism that must be actuated to disengage the pawl from the gears, enabling the gear to rotate and the cover to be withdrawn.

20 Claims, 5 Drawing Sheets

PROTECTIVE COVER FOR MOTORCYCLES AND THE LIKE

FIELD OF THE INVENTION

This invention relates to the field of protective covers, and more specifically, to retractable covers in highly compact housings designed for mounting on motorcycles and the like to protect the motorcycle from the elements.

BACKGROUND OF THE INVENTION

Motorcycle enthusiasts are known for the pride, care, and affection that they exhibit for their vehicles. They often go to great lengths to ensure that their motorcycles run properly and, more importantly, that they look "cool." They often spend a great deal of time and money purchasing a particular make and model of motorcycle, and they may deride other makes of motorcycles or those who ride them. After purchasing a cycle they often pay for custom paint jobs, replace stock parts with aftermarket chrome replacements, or purchase motorcycle related accessories. Even the clothing that they wear is selected with great care with an eye towards their appearance as they ride their cycle. Sometimes achieving an overall look or image plays a larger role than comfort, visibility, hearing, or convenience in a motorcyclist's personal decision whether to wear a helmet or other safety items.

It is not surprising that motorcyclists often spend large amounts of time taking care of their motorcycles. They wash and wax their motorcycles, sometimes even removing and cleaning underneath the gas tank. Some motorcyclists even leave their cars out on the street to leave room to garage their motorcycles.

Motorcycle enthusiasts have long struggled with the problem of how to protect their motorcycles from the elements when it is parked or stored outside. Some motorcyclists park their motorcycles under overhanging structures or in the shade whenever possible, others place large plastic sheets over their motorcycles and anchor the corners with rocks and bricks, still others use protective covers with an elastic gather at the bottom to prevent the cover from blowing off the motorcycle. However, there are problems associated with each of these. Overhanging structures are not always available, and both plastic sheets and tailored covers are not portable and take too long to setup and remove. Because of these problems, such solutions are only practical for long periods of storage.

There have been some attempts to make protective covers for motorcycles, cars, trucks, boats, and other vehicles that are more portable and easier to use. Some solutions provide a retractable vehicle cover attached to and stored on the vehicle it covers. In one form, the housing or structure attached to the vehicle incorporates a spring-actuated spool around which the protective cover is wrapped. An example of such an arrangement is disclosed in U.S. Pat. No. 4,171,145, which is hereby incorporated by reference. This type of device stores energy in the spring when the cover is withdrawn, and the energy is later used to aid in retracting the cover. However, there are serious design problems associated with known version of this type of device. In actual working practice, known devices are quite bulky and unattractive when mounted on a motorcycle, which can detract from the appearance of the motorcycle and constitutes a significant disadvantage.

The bulkiness of known designs is related to the structure of the spring-actuated spool and the length of the cover. In U.S. Pat. No. 4,171,145, the spring-actuated spool consists of a spring located within a spool and surrounding a support rod. One end of the spring is attached to the spool and the other end is fixed so that it does not rotate. When the cover is withdrawn, the spool rotates, and each rotation of the spool causes one revolution of the attached end of the spring relative to the fixed end, which causes the spring to compress and store energy.

This design directly limits the size of the protective cover and the compactness of the entire device. In actual practice, the size of the housing, the length of the cover, the spring length, and the spool diameter all constrain each other. For example, a smaller diameter spool allows a longer cover to be wrapped around the spool while maintaining the same wrapped diameter. Also, a smaller diameter spool requires more rotations to wrap a fixed length cover. Similarly, a spool of fixed diameter requires more rotations to wrap a longer cover. In actual practice, however, the length of the cover is fixed, because the cover is desirably long enough to cover a particular type of motorcycle.

When the arrangement selected requires a greater number of spool rotations to wrap a cover of known length, a longer spring is thus required, to avoid over-compression and binding against the support rod. Thus, a smaller diameter spool requires a longer spring. Because the spring is located inside the roller, which is in turn constrained by the length of the housing (that is, across the motorcycle), the housing width is affected by the spring length. In sum, using a smaller diameter spool results in a longer housing.

On the other hand, if a larger diameter spool is used to enable the use of the desired narrower housing, then the total diameter of the spool with rolled-up cover will increase. That increases the housing size in the other two dimensions and is similarly undesired.

It is not possible to escape from this dilemma merely by lengthening the spring by using additional windings in the same length spring, because such an attempted solution would result in a weaker spring force.

In actual practice, these are serious limitations. A motorcycle especially is relatively thin and long. A rear-mounted cover housing therefore requires a lot of material to cover the motorcycle. On the other hand, the spring must be relatively short, because the housing cannot safely be longer than the motorcycle is wide. Thus, using real dimensions of the motorcycle, cover, and housing—and real values of springs with appropriate ranges of drawing force—the known devices of the type shown in U.S. Pat. No. 4,171,145 do not work as desired.

Because of these design limitations, known devices of the type shown in U.S. Pat. No. 4,171,145 were bulky or had short protective covers that did not extend over the full length of the motorcycles. Some covers merely protected the seat and gas tank while exposing the rest of the motorcycle.

Other covers required pre-folding, to allow the cover to be efficiently wrapped around the spool to conserve space. Pre-folding was required to prevent the cover from bunching up as it was wrapped, increasing the diameter of the wrapped cover in places. Some known devices automatically fold the cover, but the folding devices have extra corners and other surfaces that could snag a cover.

A need exists, therefore, for a retractable vehicle cover that is compact both in length and in the other dimensions, which can be mounted to a motorcycle and not detract from the general appearance of the motorcycle, and that does not require folding before the cover is withdrawn.

SUMMARY OF THE INVENTION

It is an object of the invention, therefore, to provide an improved retractable protective motorcycle cover that is conveniently extended and retracted by the rider.

Another object of the invention is to provide a retractable protective motorcycle cover having a housing that is short in length.

Another object of the invention is to provide a retractable protective motorcycle cover that is relatively small in total diameter (if circular in cross-section) or in overall width and height (if squared).

Another object of the invention is to provide a retractable protective motorcycle cover that can be mounted on a motorcycle without detracting from the motorcycle's overall appearance.

Another object of the invention is to provide a retractable motorcycle cover that is compact overall and of pleasing proportions in relation to the motorcycle on which it is mounted.

Another object of the invention is to provide a retractable protective motorcycle cover that does not require the cover to be folded before retraction.

Another object of the invention is to provide a retractable protective motorcycle cover that adequately protects the entire length of the motorcycle from weather.

Another object of the invention is to provide a gearing system for a retractable protective motorcycle cover system.

Another object of the invention is to provide a retractable protective motorcycle cover including a mechanism for locking the cover in the extracted position.

Another object of the invention is to provide a retractable protective motorcycle cover with a locking mechanism that can be engaged at any length of extraction and is easily disengaged.

The above and other objects of the invention are achieved by providing an improved compact retractable protective covering apparatus for attachment to a vehicle. The covering apparatus is preferably enclosed in a housing and has a spool mounted in the housing and surrounding a spring, which in turn surrounds a support rod. One end of the spring is fixed in place, while the other end is structured to rotate in a fixed proportion to the rotation of the spool by a system of gears. The proportion should be less than one to one, so that the spring rotates less than the number of rotations of the spool required to withdraw the cover. A protective cover is wound around the spool and can be withdrawn from the housing and extended over the entire motorcycle.

Other aspects of the invention will be appreciated by those skilled in the art after a reading of the detailed disclosure of the present invention below.

BRIEF DESCRIPTION OF THE DRAWINGS

Common numerals are used in the several figures to indicate similar elements.

DETAILED DESCRIPTION

Figure 1:
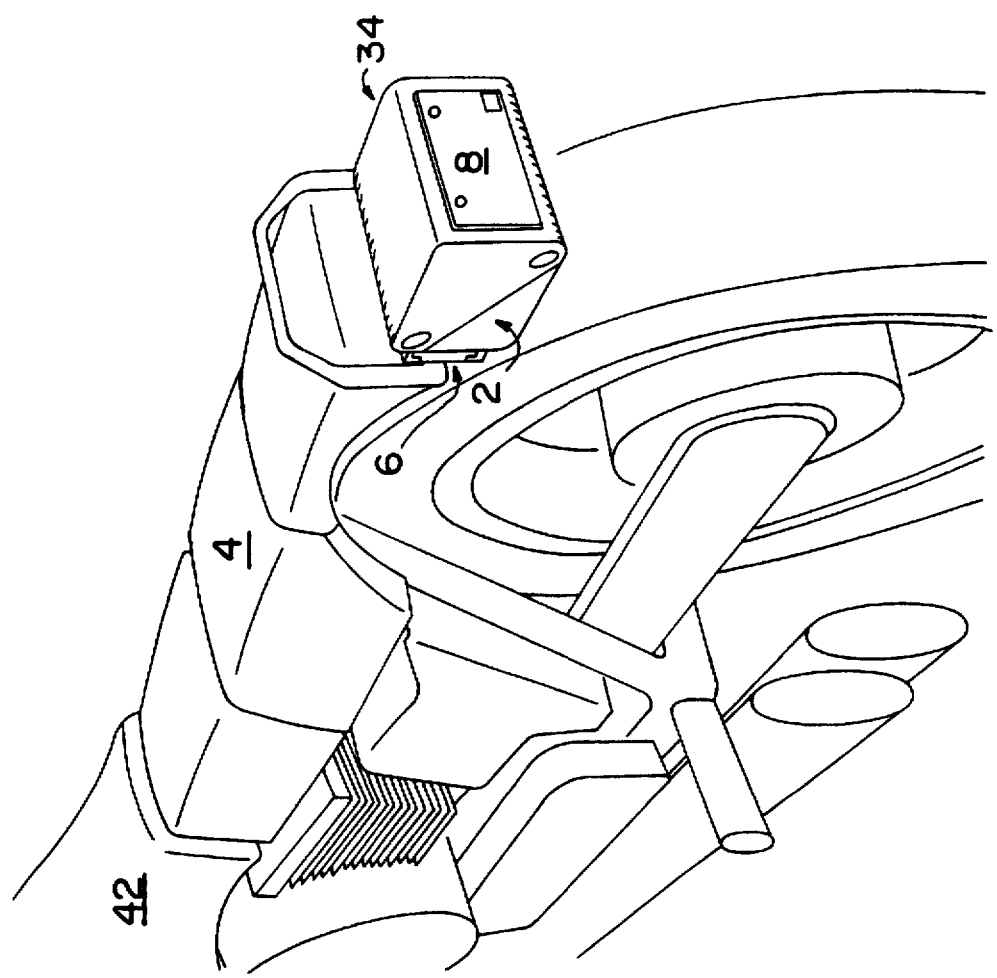
FIG. 1 is a perspective view of a preferred embodiment of the housing containing a retractable protective cover, as installed on a motorcycle.
Figure 2:
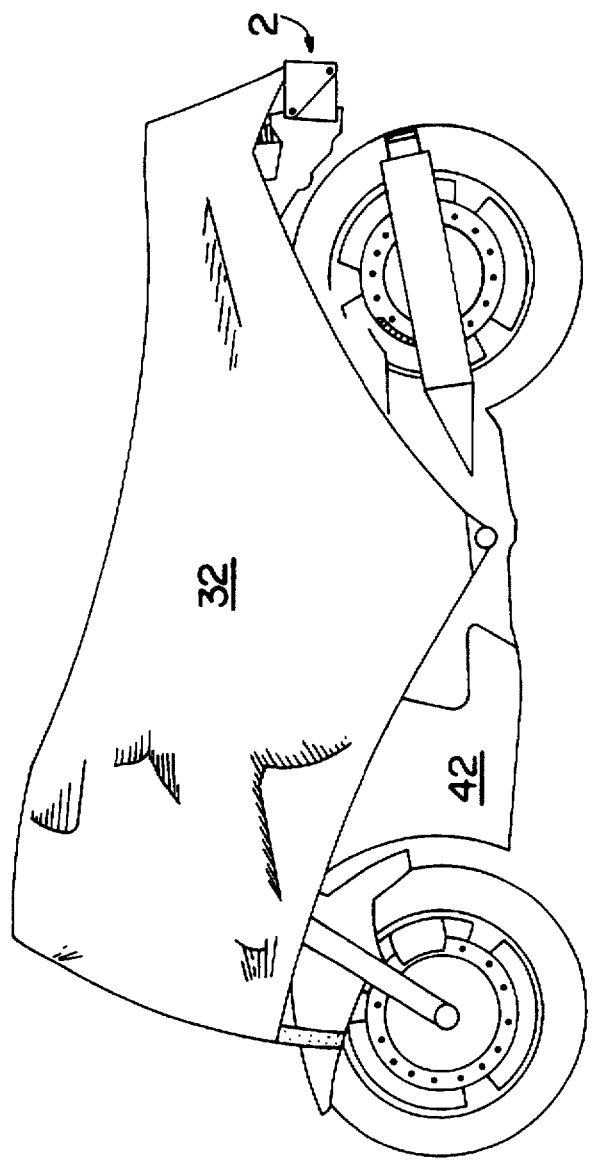
FIG. 2 is a side view of the preferred embodiment of FIG. 1 showing the protective cover extended to cover and protect the motorcycle.

Referring to FIGS. 1 and 2, a preferred form of the present invention includes a housing 2 that can be mounted behind seat 4 of a motorcycle or in another location behind a vehicle. In one form, housing 2 can be mounted into the holes used for attaching license plates by a mounting bracket 6, and a license plate 8 can then be mounted to the back of housing 2.

Figure 3:
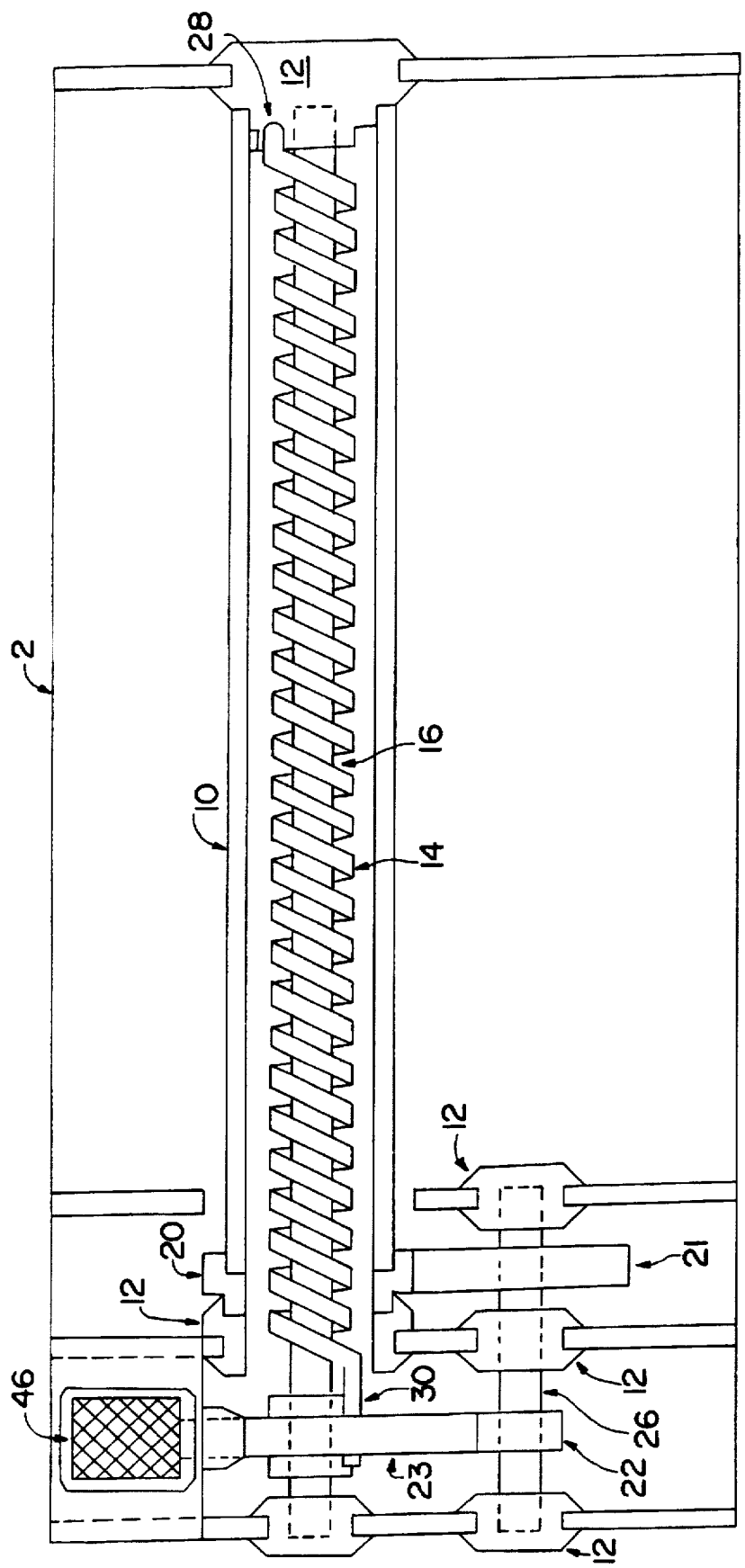
FIG. 3 is a top view of the interior of the preferred housing.

FIG. 3 shows the interior of housing 2. Generally cylindrical spool 10 is supported by and allowed to rotate about its long axis by bearings 12 supported by housing 2. Located within spool 10 is a spring 14, which in turn surrounds support rod 16. Support rod 16 is supported between two end sockets and is free to rotate about its own axis.

A rotating member, such as first gear 20 in FIG. 3, is attached to and rotates in unison with spool 10. A second rotating member, such as second gear 21, engages first gear 20. Second gear 21 has a diameter equal to the diameter of first gear 20, so that for each rotation of first gear 20, second gear 21 makes one rotation. A third rotating member, such as third gear 22, has a diameter less than the diameter of the second gear 21 and is coupled to second gear 21 by rod 26, such that third gear 22 and second gear 21 rotate in unison. A fourth rotating member, such as fourth gear 23, engages third gear 22. Fourth gear 23 is attached to and rotates in unison with support rod 16. Fourth gear 23 has a diameter greater than the diameter of third gear 22, so that for each rotation of third gear 22, fourth gear 23 makes one rotation or a fraction of a rotation.

A first end 28 of spring 14 is secured to housing 2. A second end 30 of spring 14 is attached to and rotates in unison with fourth gear 23.

Figure 4:
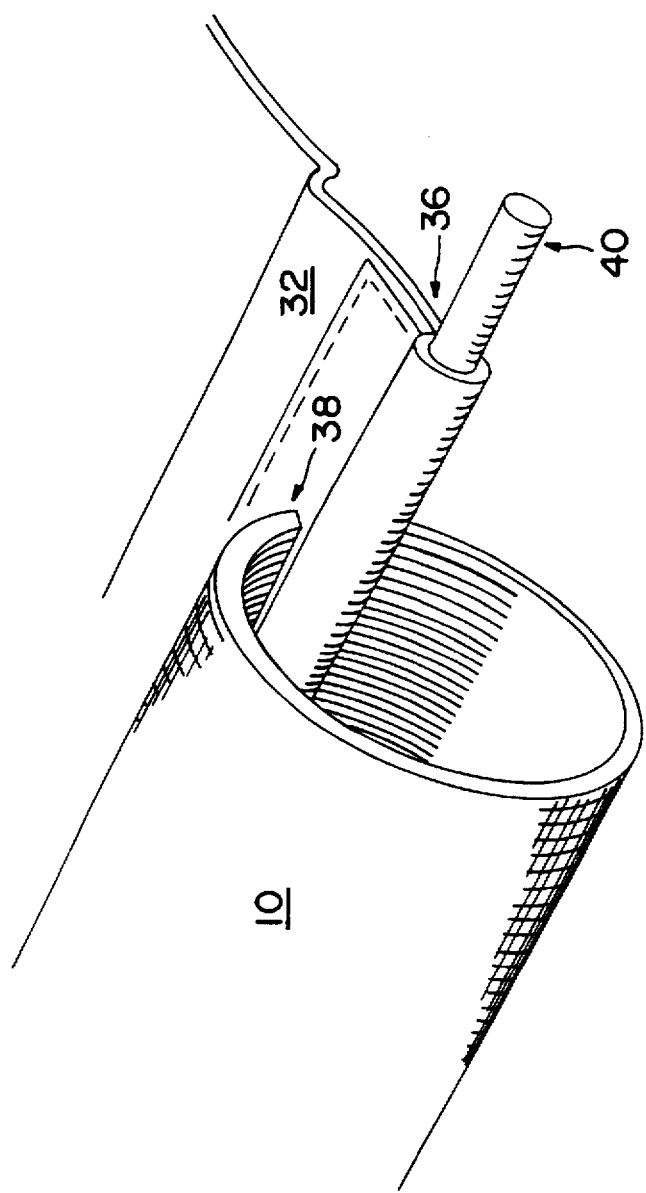
FIG. 4 is a perspective view of a preferred embodiment of the spool used in the protective cover apparatus.

As shown in FIG. 4, one end of retractable protective cover 32 is attached to spool 10 or otherwise prevented from disengaging from spool 10. FIG. 4 shows one preferred system of preventing protective cover 32 from disengaging from spool 10. The end of cover 32 is folded over and stitched or otherwise attached to itself to form loop 36. Loop 36 is placed through opening 38 that is provided along the length of spool 10. Cover holding rod 40 is placed through loop 36 and prevents cover 32 pulling through spool opening 38. Other cover attachment arrangements are also suitable.

As protective cover 32 is pulled out of housing 2 from an initial position of being fully wound around spool 10, spool 10 is caused to rotate. As seen in FIG. 3, the rotation of spool 10 rotates first gear 20, which is attached thereto, which in turn rotates engaged second gear 21. If first and second gears 20, 21 are of the same diameter, each rotation of spool 10 will cause one rotation of second gear 21. The rotation of second gear 21 drives third gear 22, through the medium of rod 26, so each rotation of spool 10 will also cause a single rotation of third gear 22, regardless of the relative sizes of second and third gears 21, 22.

Third gear 22 engages fourth gear 23, but the difference in diameters (in the embodiment shown in FIG. 3) results in fourth gear 23 making only a fraction of a rotation for each rotation of spool 10. Fourth gear 23 is attached to spring end 30, and the other end 28 of spring 14 is fixed, so rotation of fourth gear 23 will cause spring 14 to compress. Because of the gearing arrangement, however, the two ends 28, 30 of spring 14 will rotate relative to each other only a fraction of a rotation for each rotation of spool 10—the same fraction as fourth gear 23 rotates for each rotation of spool 10.

Thus, the inventive system prevents spring 14 from overcompressing and binding against support rod 16, even if spool 10 is rotated many times.

Protective cover 32 is preferably made from a flexible, waterproof material, such as nylon. A slot can be provided in housing 2, or a hinged housing cover 34 (roughly illustrated in FIG. 1) can be provided for housing 2, to allow protective cover 32 to be extracted from housing 2. Any suitable mechanism useful to permit the user to grasp the outside end of protective cover 32 easily is also preferred, such as a device that prevents the end of protective cover 32 from passing inside housing 2 or an external handle attached to the end of protective cover 32.

Spool 10 rotates as protective cover 32 is withdrawn and spring 14 stores energy by compressing. When protective cover 32 is released, the energy stored in spring 14 draws protective cover 32 back into housing 2.

Because the inventive gearing system shown in FIG. 3 causes spring 14 to rotate only a fraction of a turn for each rotation of spool 10, it is possible to use an arrangement that allows more turns of spool 10 without over-compressing spring 14. In addition, because spring 14 in effect has a mechanical advantage over the rotation of spool 10, a weaker spring 14 can achieve the same results, resulting in reduced materials cost.

Because the inventive design permits a smaller diameter spool, a longer retractable cover 32 can be used, which extends from housing 2 over the top and down the sides of motorcycle 42, as seen in FIG. 2. Retractable cover 32 can be secured at the front and sides of the motorcycle, to protect virtually the entire vehicle from the elements.

Figure 5:
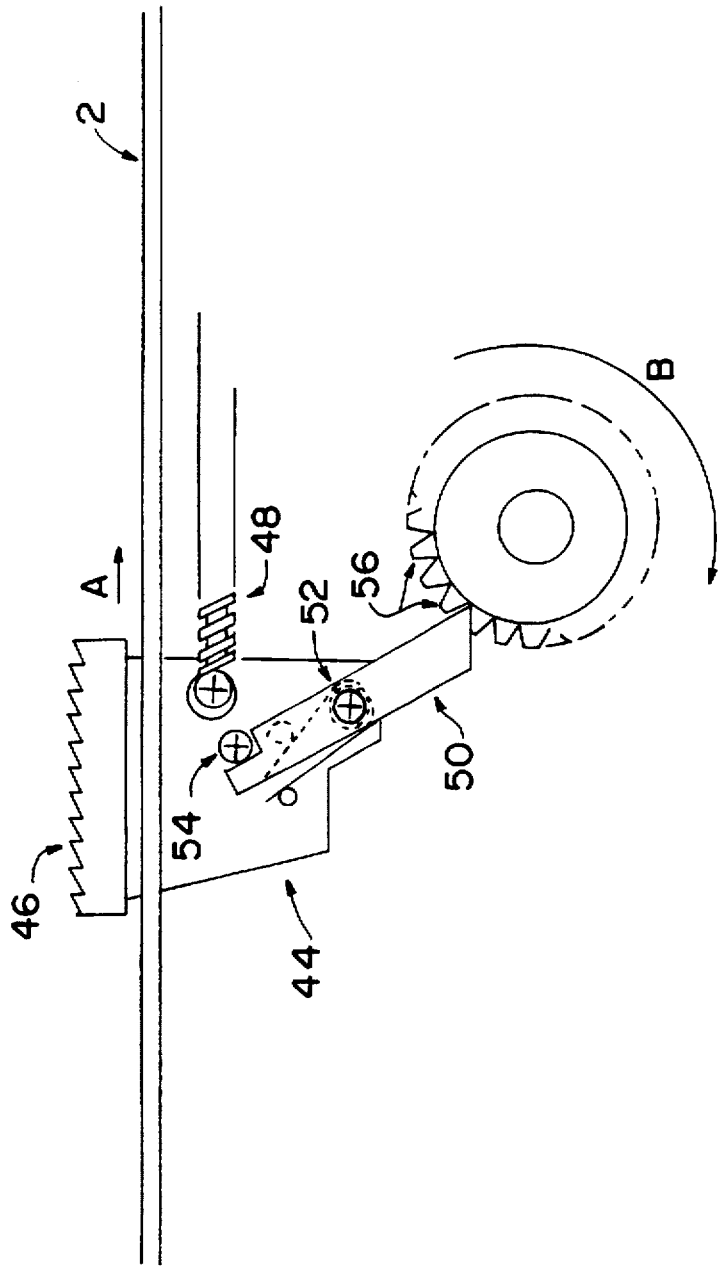
FIG. 5 is a side view of a preferred locking mechanism useful in connection with the housing.

FIG. 5 illustrates an optional locking mechanism 44, designed to prevent protective cover 32 from retracting into housing 2 when in use and to provide a convenient method of retraction when the protective cover is no longer in use. Locking mechanism 44 includes a lever 46 mounted to housing 2. Lever 46 (also shown from the top in FIG. 3) is biased towards a locked position by switch-return spring 48, which can be attached to housing 2. Pawl 50 is pivotally attached to lever 46 and has a spring-loaded axis 52 that biases pawl 50 against pawl stop 54 and one of gear teeth 56. Pawl 50 allows fourth gear 23 to rotate in the protective cover-extraction direction (indicated by arrow B) and prevents it from rotating in the retraction direction until locking mechanism 44 is disengaged. In the particular embodiment shown in FIG. 5, lever 46 is pulled in the direction of arrow A to disengage locking mechanism 44, however alternate designs are possible. This allows the user to return protective cover 32 to housing 2 merely by disengaging protective cover 32 from motorcycle 42 and pulling lever 46. However, protective cover 32 can be withdrawn from housing 2 smoothly and without manipulating any manual switches or levers.

The present invention has a number of advantages over the prior art, especially when used on motorcycles. The present invention allows use of a larger protective cover and therefore protects more of the motorcycle. Another advantage is that the present invention minimizes housing size by allowing the use of both smaller diameter spools and a shorter spring in the same device. Yet another advantage of the present invention is that the smaller housing does not detract from the physical appearance of the motorcycle on which it is mounted. Yet another advantage of the present invention is that the protective cover does not have to be neatly folded before retraction because space is not at such a high premium as in prior art devices.

Other arrangements can achieve the same results and are within the scope of the invention. For example, the sizes or numbers of gears can be varied, or the connections between the gears can be altered as long as the two ends 28, 30 of spring 14 will rotate relative to each other a fixed fraction of a rotation for each rotation of spool 10. First through fourth gears 20–23 can be alternatively engaged through belt drives instead of gear teeth or they can be replaced by a system of frictionally engaged gears. The mechanical advantage that occurs between third and forth gear 22 and 23 can occur elsewhere in the system of gears. Rod 26 can be removed and gears 21 and 22 formed as a dual gear. In addition, rod 16 can be non-rotating, with an appropriate bearing placed between rod 16 and fourth gear 23, instead of fourth gear 23 being attached to rod 16. Spring 12 is shown as a helical band, but a helical wire spring is an adequate substitute. Alternatively, a multiple helix can be used. Spring 12 can be mounted so as to extend only partially through spool 10. A plurality of springs connected end to end, a rubber band, and an elastic bar are all equivalents of spring 12. Housing 2 can be circular in cross-section, square, a variety of other shapes, or square with rounded corners, as shown. Spool 10 can be cylindrical in shape and have a circular cross-section or may have a cross-section of a different shape, such as a square. Likewise, spool 10 may not have an opening along its length, and the cover may be glued, looped around, or otherwise attached to spool 10. Rod 26 can be circular in cross-section or in any other shape. It will also be apparent to those skilled in the art that locking mechanism 44 may be designed in a variety of ways that would be biased in a locked or engaged position, but would have to be manually disengaged or unlocked by pulling or pushing of lever 46 or some other button.

The preferred embodiments of the inventions are described in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the word "function" in the specification is not intended to invoke the provisions of 35 U.S.C. §112, ¶6 to define the invention. To the contrary, that paragraph will be considered to define a claimed element of the invention, only if the phrases "means for" or "step for" and a function, without also reciting in that element any structure, material, or act in support of the function, are specifically recited in that element. Moreover, even if the provisions of 35 U.S.C. §112, ¶6 are invoked to define the invention, patentee intends that the invention not be limited to the specific structure, material, or acts that are described in the preferred embodiments. Rather, "means for" or "step for" elements are nonetheless intended to cover and include within their scope any and all known or later-developed structures, materials, or acts that perform the claimed function, along with any and all equivalents.

It is understood by those skilled in the art that numerous other alternate forms and embodiments of the invention can be devised without departing from its spirit and scope, which are defined in the claims that follow.

I claim:

1. A compact apparatus for attachment to a motorcycle and for enclosing a retractable protective cover of flexible material comprising:
   (a) a housing;
   (b) a spring having a first end coupled to the housing and a second, rotating end;
   (c) a spool structured to support the protective cover, surrounding the spring, and rotationally mounted in the housing;
   (d) a rotating member rotationally mounted in the housing and coupled to the second end of the spring; and (e) a gearing system coupled to the spool and the rotating member and structured to cause the second end of the spring to make a fraction of a rotation, in a rotational direction that compresses the spring, when the spool rotates in a full rotation.

2. The apparatus of claim 1 wherein the gearing system comprises a plurality of other rotating members.

3. The apparatus of claim 2 wherein the other rotating members are toothed gears.

4. The apparatus of claim 3 wherein the gearing system comprises three gears.

5. The apparatus of claim 4 wherein the spool is cylindrical.

6. The apparatus of claim 5 wherein the spool has a slot along its length.

7. The mechanism of claim 1 wherein the gearing system is outside of the spool.

8. The apparatus of claim 2 further comprising a locking mechanism coupled to the rotating member and biased in a first, locked position to prevent the spool from rotating in at least one direction, the locking mechanism having a second, unlocked position disengaged from the rotating member, thereby allowing the rotating member to rotate when the locking mechanism is manually disengaged from the first, locked position.

9. The apparatus of claim 8 wherein the locking mechanism includes a manually operated lever.

10. The apparatus of claim 9 wherein the gearing system comprises a plurality of toothed gears, and wherein the locking mechanism further comprises a pawl coupled to the lever so that, when the locking mechanism is in the first, locked position, the pawl engages a toothed gear that is one of the rotating members, thereby preventing the spool from rotating, and wherein the pawl and the lever are positioned so that the pawl disengages from the gear when the lever is actuated.

11. The apparatus of claim 10 wherein the gearing system comprises three gears, and wherein the spool is cylindrical with a slot along its length.

12. A compact retractable protective cover apparatus for attachment to a motorcycle comprising:

(a) a housing;

(b) a support rod mounted in the housing;

(c) a spiral spring surrounding the support rod and having a first end coupled to the housing;

(d) a spool surrounding the spring and rotationally mounted in the housing;

(e) a first gear fixed to and rotating in unison with the spool;

(f) a second gear in and rotationally mounted to the housing and engaging the first gear;

(g) a third gear in and rotationally mounted to the housing and coupled to the second gear to rotate in unison with the second gear;

(h) a fourth gear in and rotationally mounted to the housing, engaging the third gear, and coupled to a second end of the spring;

(i) wherein the first through fourth gears are sized and structured to cause the second end of the spring to make a fraction of a rotation around the support rod, in a rotational direction that compresses the spring, for each full rotation of the spool; and (j) a protective cover coupled to the spool and formed of a flexible material, substantially all of which material is wound around the spool inside the housing and extensible out of the housing, thereby engaging the first through fourth gears and causing compression of the spring.

13. The apparatus of claim 12 further comprising a locking mechanism comprising:

(a) a lever coupled to the housing; and (b) a pawl biased in a first position wherein the pawl engages one of the four gears to prevent the gear from rotating;

(c) wherein the pawl and the lever are coupled together so that manual actuation of the lever moves the pawl to a second position disengaged from the gear.

14. The apparatus of claim 13 wherein the lever is spring-biased in a first direction, thereby biasing the pawl in the first position.

15. The apparatus of claim 14 further comprising a pawl stop coupled to the lever, the pawl being coupled to the lever through a spring-loaded axis that biases the pawl against the pawl stop.

16. The apparatus of claim 15 wherein the spool is cylindrical and has a slot along its length, wherein one end of the protective cover forms a loop, further comprising a rod positioned in the loop, which rod is wider than the slot, and wherein the protective cover is coupleable to the spool by insertion into the slot of the end of the cover with the rod in place.

17. A mechanism for storing a retractable protective cover inside a housing adapted for attachment to a motorcycle comprising:

(a) spring means for pulling a quantity of a flexible material forming a protective cover into the housing, the spring means being coupled to the housing;

(b) spool means, surrounding the spring means and rotationally mounted in the housing, for taking up the material of the protective cover; and (c) gearing means, coupled to and outside the spool means and the spring means, for causing the spring means to make a fraction of a rotation in a compressional direction for each full rotation of the spool means when the material is withdrawn from the housing.

18. The mechanism of claim 17 further comprising:

(a) locking means, structured to engage the gearing means, for preventing the spool means from rotating in the cover-retraction direction; and (b) unlocking means, coupled to the locking means, for disengaging the locking means to allow the retraction of the protective cover.

19. The mechanism of claim 18 further comprising means, coupled to the unlocking means, for biasing the unlocking means in a locked direction.

20. The mechanism of claim 19 further comprising:

(a) stopping means, coupled to and structured to engage the unlocking means, for preventing the locking means from rotating about its axis in one direction; and (b) means for biasing the locking means against the stopping means.

* * * * *